United States Patent [19]

Desrosiers et al.

[11] Patent Number: 5,337,265
[45] Date of Patent: Aug. 9, 1994

[54] APPARATUS FOR EXECUTING ADD/SUB OPERATIONS BETWEEN IEEE STANDARD FLOATING-POINT NUMBERS

[75] Inventors: Bernard Desrosiers, Boissise le Roi; Didier Louis, Fontainebleau; Andre Steimle, Evry, all of France

[73] Assignee: International Business Machines Corporation, Armonk, N.Y.

[21] Appl. No.: 981,031

[22] Filed: Nov. 24, 1992

[30] Foreign Application Priority Data

Dec. 20, 1991 [EP] European Pat. Off. ........ 91480188.1

[51] Int. Cl.⁵ .............................................. G06F 7/50
[52] U.S. Cl. .................................................. 364/748
[58] Field of Search ......................................... 364/748

[56] References Cited

U.S. PATENT DOCUMENTS

| | | | |
|---|---|---|---|
| 3,551,665 | 12/1970 | Powers et al. | 364/748 |
| 4,644,490 | 2/1987 | Kobayashi et al. | 364/748 |
| 4,719,589 | 1/1988 | Tanaka | 364/748 |
| 4,994,996 | 2/1991 | Fossum et al. | 364/748 |
| 5,075,882 | 12/1991 | Sakai et al. | 364/748 |
| 5,086,405 | 2/1992 | Chung et al. | 364/748 |
| 5,197,023 | 3/1993 | Nakayama | 364/748 |
| 5,247,471 | 9/1993 | Hilker et al. | 364/748 |

Primary Examiner—David H. Malzahn
Attorney, Agent, or Firm—H. Daniel Schnurmann

[57] ABSTRACT

A numeric data coprocessor having an execution unit adapted to efficiently execute addition/subtraction operations on floating-point numbers in compliance with the IEEE standard 754. The mantissa adder carry out bit resulting from the operation on two operands X and Y is directly concatenated with the mantissa adder result in the mantissa output register to be the MSB thereof. Simultaneously, a 1 is added to the exponent of operand X or Y with the highest value. The final result is found after normalizing, regardless of whether the carry out bit is 1 or 0.

In its hardware embodiment, taking for example the 80-bit double extended precision IEEE format, the mantissa output register has 68 positions. The 68th supplementary position is fed by the carry out bit generated by the mantissa adder at the "carry out" output. The "Force Carry" input of the exponent adder is activated by the control logic circuitry to add a 1 to the operand exponent with the highest value.

7 Claims, 4 Drawing Sheets

APPARATUS FOR EXECUTING ADD/SUB OPERATIONS BETWEEN IEEE STANDARD FLOATING-POINT NUMBERS

FIELD OF THE INVENTION

The present invention relates to numerical data processors, and more particularly, to an apparatus for executing addition/subtraction operations between IEEE standard floating-point numbers.

BACKGROUND OF THE INVENTION

In order to provide greater computing power for those applications requiring significant numbers of floating-point operations, some numerical data processors implement in hardware the essential floating-point instructions, such as addition, subtraction, multiplication and division. Most commonly, these floating-point instructions are directly integrated into the data processor silicon chip. Alternatively, these floating-point instructions are provided in a separate numerical data processor, a so-called mathematical or numeric coprocessor, which cooperates with the main data processor to execute the floating-point instructions.

Numerical values or data used in scientific or technical calculations are expressed in a floating-point number configuration consisting of a sign S, an exponent E and a mantissa M, which permits the expression of a wide range of numerical values in a limited number of bits. There is a number of different standard formats to implement this configuration. In particular, a typical widely accepted floating-point format is the standard format proposed by the Institute of Electrical and Electronics Engineers (IEEE). This standard defines four floating-point formats: single, single extended, double and double extended precision.

By way of example, an 80-bit double extended precision format will be discussed below because this format is extensively used in microcomputer chips. As illustrated in FIG. 1, it consists of a 1-bit sign, a 15-bit exponent and a 64-bit significand. In this format, at location 63, an explicit 1 is stored in the significand part of the format, except for some particular values such as 0. The remaining 63-bit part of the significand comprises the mantissa M. In addition, the exponent is expressed in a biased form, i.e., a constant referred to as BIAS=16383, is added to the real value E of the exponent (true exponent). With the format of FIG. 1, 64 mantissa bits of precision are obtained representing a number within the range of $-2^{16384}$ (the greatest negative number) and $+2^{16384}$ (the greatest positive number). Finally, according to the IEEE standard format, the value of a real number N is given by:

$$N=(-1)^{**}S^{*}1.M^{*}2^{**}(E+BIAS)$$

wherein S=0 for a positive number and S=1 for a negative number.

A valid (or normalized) number N is given by 0<E+BIAS<32767. The case in which the value of the biased exponent is at its maximum (i.e. E+BIAS=32767) and the mantissa M≠0, it is specially treated as a "non-number." The case in which the value of the biased exponent is at its maximum and the mantissa M=0, is specially treated as infinity. Finally, the case in which the value of the biased exponent E+BIAS is at its minimum, (i.e., equal to 0) is exceptionally treated as a denormalized number. Further details can be found in the document: "A Proposed Standard for Binary Floating-Point Arithmetic", Draft 8.0 of IEEE Task P754, 1981.

Whenever data processed in the 80-bit floating-point format is used by a numeric coprocessor in accordance with the IEEE standard format, addition/subtraction operations normally entail requiring a large amount of processing steps and a corresponding number of machine cycles. This point will now be illustrated for an addition by reference to Examples I and II.

EXAMPLE I

To add operands X=1.01*2**2 (5 decimal) and Y=1.00*2**1 (2 decimal), we have first to realign the mantissa of Y (which is the operand of the smallest magnitude) to have both operands X and Y with the same exponent. As a result, Y can be appropriately written as Y=0.10*2**2. (Note: as such, Y is no longer a normalized number according to the IEEE format).

Now, the addition operation can take place.

|   | sign | oper. | c M | E |
|---|---|---|---|---|
| + | + | X = | 1.01 | 2 |
|   | + | Y = | 0.10 | 2 |
|   | + | Z = | 01.11 | 2 |

In this instance, there is no carry out bit c, i.e., c=0, and this operation directly results in a normalized number Z=1.11*2**2 (7 decimal).

EXAMPLE II

To add operands X=1.01*2**2 (5 decimal) and Y=1.11*2**2 (7 decimal) that have the same exponent value, the addition operation can be represented as:

|   | sign | oper. | c M | E |
|---|---|---|---|---|
| + | + | X = | 1.01 | 2 |
|   | + | Y = | 1.11 | 2 |
|   | + | Z = | 11.00 | 2 |

In this instance, one notices the existence of a carry out bit c=1. The result Z=11.00*2**2 (12 decimal) is not a IEEE format normalized number. Therefore, the result is stored back as Z=1.1*2**3, which is a normalized number, to comply with the IEEE standard format. The conversion is accomplished through the additional step of shifting right the Z mantissa and adding 1 to the Z exponent for compensation. This step of mantissa and exponent correction may be repeated after rounding when intermediate computation results include the three precision extra-bits (sticky, guard, and rounding bit) as illustrated in FIG. 1. The IEEE standard describes three rounding modes. For example, a number whose 64 positions of the significand are filled with 1's and three precision bits are 100, as required in the most frequently used rounding mode, the rounding operation consists in adding 1 to the LSB (least significant bit) of the significand. As a result, a carry bit is propagated along the 64 positions and a final carry out bit is generated.

As summarized in FIG. 2, nine steps are required in the more general case. The essence of each step will be briefly detailed below for the addition of two operands X and Y.

Step 1. In this preliminary step, operands X and Y are checked according to the IEEE standard set of rules (data valid, one operand equals to zero, infinity, denormalized numbers, etc.).

Step 2. Addition operation requires having operands with identical exponents. The exponent of the result will be the exponent X or Y having the highest magnitude. To this end, the respective exponents of operands X and Y are compared, and if found different, the exponent difference is stored.

Step 3. If the difference of exponents determined in step 2 is not equal to 0, the mantissas of operands X and Y are aligned, i.e., the mantissa of the operand with the smallest magnitude is aligned with the mantissa of the operand having the highest magnitude. If the difference between the exponents is equal to 0, then step 3 is bypassed.

Step 4. Addition of the mantissas is performed in the mantissa adder, depending upon operand signs. The result of this operation is represented by operand Z, whose sign is also determined. Note that the value of operand Z is globally determined, but its binary format may change during the remaining steps until the final desired IEEE standard format is obtained. If a carry out bit ($c=1$) is generated during this step, both the exponent and the mantissa of the result must be corrected in step 5 otherwise, step 5 is bypassed.

Step 5. Mantissa and exponent correction: the Z mantissa is shifted right and a 1 is added to the Z exponent.

Step 6. If operand Z mantissa includes more than one leading 0, it requires a so-called "normalization". The number of leading 0's is subtracted from the Z exponent, and the Z mantissa is normalized.

Step 7. The Z mantissa is rounded if necessary, according to the selected rounding IEEE mode. Should this step of rounding generate a new carry out bit $c'$, a new mantissa and exponent correction step is required.

Step 8. Mantissa and exponent correction: if the existence of a new carry out bit $c'=1$ is detected: Z mantissa is shifted right and a 1 is added to the Z exponent. Alternatively, if $c'=0$, this step is bypassed and operand Z is correct.

Step 9. The sign, exponent, and mantissa of operand Z in the IEEE standard format are stored.

As apparent from the above discussion, in the cases where existence of an adder carry out bit $c=1$ is detected after adding mantissas and after rounding, two more steps are necessary that apply to an addition where no carry out bit is generated. A similar reasoning applies for a subtraction operation.

FIG. 3 shows a schematic block diagram of a typical apparatus 10 designed by someone skilled in the art for the direct hardware implementation of above processing steps 1 to 9, and for any ADD/SUB operation pursuant to the IEEE 80-bit double extended precision format of FIG. 1. For sake of simplicity, control logic circuits and control lines, including the clock signals are omitted.

Referring now to FIG. 3, the structural description of the various circuits composing apparatus 10 is shown. Exponents and mantissas of operands X and Y are separately stored in different input registers. Originally, exponents of operands X and Y, respectively EX and EY, are stored in input registers 11 and 12. Likewise, mantissas of operands X and Y, respectively MX and MY, are stored in input registers 13 and 14. Operands X and Y are sequentially or preferably simultaneously extracted from two zones of a stack register 15, e.g. respectively at addresses 0 and i ($i=1$ to 7). Stack register 15 is a two-port READ and one-port WRITE type. The E-BUS and M-BUS are dual data busses that, respectively, convey the exponent and mantissa data out of stack 15. For example, busses E0 and M0, respectively, convey the exponent and mantissa of operand X stored in the stack at address 0 to their respective input registers 11 and 13. Busses Ei and Mi respectively convey the exponent and mantissa of operand Y stored in the stack at address i to their respective input registers 12 and 14.

Addition/subtraction (ADD/SUB) operation between operands X and Y takes place in adders 16 and 17, respectively, for the exponents and the mantissas. Basically, adders are loaded with the data contained in their respective input registers. Each adder includes one true/complement (T/C) input as explained hereinafter. The data computed by the adders, i.e., the partial results of the ADD/SUB operation, are stored in two distinct output registers. The data is loaded directly in output register 18 from adder 16, for exponent data, and in output register 19 from adder 17, for the mantissa data. Output of register 18 is connected to stack 15 via the E'-BUS. The output of register 19 is connected to a combined 1-bit right shifter register 20. Circuit 20 is preferably a multiplexer controlled by the carry out bit c generated by the mantissa adder 18 at the "carry out" output CO (once latched) via the 1-bit control line 21. Circuit 20 has also storage capabilities. The output of circuit 20 is connected both to a normalizer circuit 22 and to an encoder circuit 23. Whenever necessary, the mantissa stored in circuit 20 is arranged at the IEEE format in normalizer 22. The number of leading 0's of the mantissa stored in circuit 20 is encoded in encoder circuit 23, and is then stored in a leading zero register 24. The encoded number also controls normalizer 22 via control bus A-BUS. At the output of normalizer 22, the bus M'-BUS is applied to the input of stack 15. The output bus E'-BUS of register 18 is connected to encoder circuit 25, so that its content value is encoded therein. The output of circuit 25 is applied to aligner 26 via control bus B-BUS. Aligner 26 drives input register 14. The carry out bit c generated in mantissa adder 17 is stored in a latch 27 whose output is connected to the "carry in" input (CI) of exponent adder 16 and to the control input of circuit 20 above. Since a rounding operation of the mantissa result may be necessary, the output of register 18 is applied to the left input of exponent adder 16 via the E'-BUS and the two-way multiplexer circuit 28. The second input of circuit 28 is fed by register 11. Similarly, the output of register 24 is also applied to the right input of adder 16 via the E'-BUS and the two-way multiplexer circuit 29. The second input of circuit 29 is fed by register 12. Each bit generated by register 12 is applied to one input of a XOR circuit (not shown) included in adder 16 as standard, and which other input receives a control bit generated by the control logic which depends on the operation ADD or SUB to be completed. If the control bit is equal to 0, the bit is not complemented; it is the true input (T); otherwise the bit is complemented, (i.e., complement input C). For sake of simplicity, this control command is illustrated by the T/C input of adder 16. As far as the mantissa adder is concerned, the M-BUS and the M'-BUS are applied to two three-way multiplexer 30 and 31 which respectively feed registers 13 and 14, through aligner 26. The sign exponent and mantissa of the result, i.e. operand Z after normalization and rounding, are stored in stack 15 via E'-BUS and M'-BUS busses respectively. Stack 15 operates as a RAM in which all binary operands and signs are stored. The circuits for sign processing are not shown.

By way of illustration, an addition operation of two operands X and Y will be described next in conjunction with the hardware of FIG. 3 and the step sequence of FIG. 2. It illustrates the data flow during the nine processing steps that are required by the addition operation of the more general case.

Step 1. Operands X and Y are checked as mentioned in the preliminary step 1 previously described. Operand X which is stored in stack 15 at address 0, is directly loaded in input registers 11 and 13, respectively, for its exponent EX and mantissa MX components. Similarly, the exponent EY and mantissa MY of operand Y which are stored in stack 15 at address i are then loaded as such (aligner 26 is inactive) in input registers 12 and 14.

Step 2. Comparison of exponents is made in adder 16, which proceeds to the difference of exponents, i.e., it performs EX-EY. The exponent difference is stored in output register 18. This amount is coded in circuit 25. It subsequently controls aligner circuit 26 via control bus B-BUS. If the exponent difference is equal to 0, no alignment in aligner 26 is necessary. The mantissas that have been loaded in registers 13 and 14 are correct. Alternatively, if the exponents are different, e.g. EX->EY, the mantissa of operand of the smallest magnitude, i.e., Y needs to be aligned.

Step 3. During this step, operand mantissas are aligned if EX-EY≠0.
  If EX−EY<0, the mantissa of operand X is aligned in circuit 26 before being stored in input register 14, while mantissa of operand Y is stored in input register 13.
  If EX−EY>0, the mantissa of operand Y is aligned in circuit 26 before being stored in input register 14, while mantissa of operand X is stored again in input register 13.

Briefly summarized, step 3 is optional. If EX−EY=0, it is bypassed because no alignment is necessary. If EX−EY≠0, the operand with the smallest magnitude must be loaded in register 14 to overwrite the content thereof.

Step 4. The desired mantissa addition operation, takes effect in adder 17 according to operand signs. The result, i.e., the mantissa of operand Z, is stored in output register 19. Simultaneously, the carry out bit c is stored in latch 27. If c=1, it will subsequently be used to make an exponent/mantissa correction in the next step. The biggest exponent (depending on the comparison achieved in step 2) is now stored into output register 18.

Step 5. Depending upon the value of the adder carry out bit c stored in latch 27, the content of output register 19, i.e., the mantissa of operand Z is either shifted right (c=1) or it is not (c=0) and it is or not stored in circuit 20. If c=1, the exponent correction is also completed. To that end, the content of register 18 is applied to the left input of adder 16 via multiplexer 28 and the E'-BUS and a 1 is forced on the "Carry In" input (CI) to perform the +1 addition. The correct exponent is then stored in register 18.

Step 6. The mantissa of operand Z is normalized in normalizer 22. The content of circuit 20 is applied to input register 13 via normalizer 22 and M'-BUS for subsequent rounding when required. The number of leading 0's is encoded in encoder 23 and stored in register 24 for subsequent subtraction from the exponent. The exponent is adjusted by the number of leading 0's. The content of register 24 is applied to the right input of adder 16 via multiplexer circuit 29 and is subtracted from the content of output register 18, which is applied to the left input of adder 16. The result is loaded in register 18.

Step 7. The mantissa rounding operation takes place where required according to the selected IEEE standard mode. As previously shown, it may simply consist in adding a 1 to the LSB of the normalized mantissa. To that end, the normalized result is applied to the left input of adder 17 and a 1 is applied to the right input. The appropriate command applied to the T/C input to perform the addition. This operation may generate a new carry out bit c'. The output of adder 17 is loaded in output register 19. Bit c' is also stored in latch 27.

Step 8. This step is similar to step 5 except in that the mantissa and exponent correction depends now on the value of the carry out bit c'.

Step 9. Operand Z, comprised of the sign bit SZ, the exponent EZ and mantissa MZ respectively stored in a latch (not shown), in register 18 and in circuit 20, is transferred to stack 15 at address 0.

As apparent from the above discussion, a combined 1 bit right shifter/register 20 is required, as well as a latch 27 for storing the carry out bit c (or c'). In addition to performing the addition of two numbers when a carry out bit is generated (as illustrated by Example II), it requires not only extra hardware but it, additionally, slows down execution time by introducing an additional step, e.g., step 5, with respect to the operand processing of Example I where no carry out bit is generated. Because this step may be repeated after rounding, ultimately, up to two steps of mantissa and exponent correction may be required, which necessitates a number of machine cycles. The subtraction operation is completed in the same way.

As apparent from the above, in such numeric co-processors, execution of ADD/SUB operations of floating-point IEEE format numbers (referred to as operands) is a major concern because its frequent reoccurrence. Consequently, there exists a permanent need to execute them with the simplest possible hardware and the minimum number of steps.

OBJECTS OF THE INVENTION

A primary object of the present invention is to provide an improved apparatus with reduced hardware for facilitating high-speed ADD/SUB operations between IEEE standard floating-point format numbers with a minimum number of machines cycles.

Accordingly, following the ADD/SUB operation of operands X and Y, depending on the instructions and the signs, the adder carry out bit generated by the mantissa adder is directly stored in the mantissa output register as the MSB of the final result mantissa and a 1 is added to the exponent with the highest value to form the final result exponent. The final operand Z is thus found after either the ADD/SUB operation step or the normalization step. Therefore, the same data path is used in all cases regardless of whether the carry out bit is equal to 1 or to 0.

With respect to the method of FIG. 2, the first step (step 5) of exponent and mantissa correction is no longer required and is thus eliminated; the second step (step 8) is simplified. As a result, the number of machine cycles that are required for any ADD/SUB operation is significantly reduced.

From a hardware aspect, taking as an example the extended double precision 80-bit double extended IEEE format illustrated in FIG. 1, the mantissa adder output register must have a 68th supplementary position with respect to the standard solution shown in FIG. 3. This position is directly fed by the carry out bit c generated by the mantissa adder, where it is stored as the MSB (Most Significant Bit) of the adder result. In addition, the "Force Carry" input of the exponent adder is activated by the control logic so that a 1 is added to the adder exponent. As a result, the 1 bit-right shifter/register circuit and the control logic circuitry related thereto are eliminated.

BRIEF DESCRIPTION OF THE DRAWINGS

The foregoing and other objects of the invention will become more apparent from the following detailed specification which sets forth illustrative embodiments of the invention. The drawings form part of this specification, wherein.

DESCRIPTION OF THE INVENTION

According to the present invention, the mantissa adder carry out bit c, when generated after ADD/SUB operation on operands X and Y, is stored as the MSB of the mantissa adder result, i.e., operand Z mantissa and a 1 is systematically added to the largest exponent EX or EY. As will be demonstrated below, operating in this manner will save one processing step and mainly circuit 20 in the apparatus of FIG. 3. The description which follows is still based upon the addition of operands X and Y as depicted in Examples I and II to demonstrate that the ADD operation is processed the same way irrespective the presence of a carry out bit or not.

Figure 4:
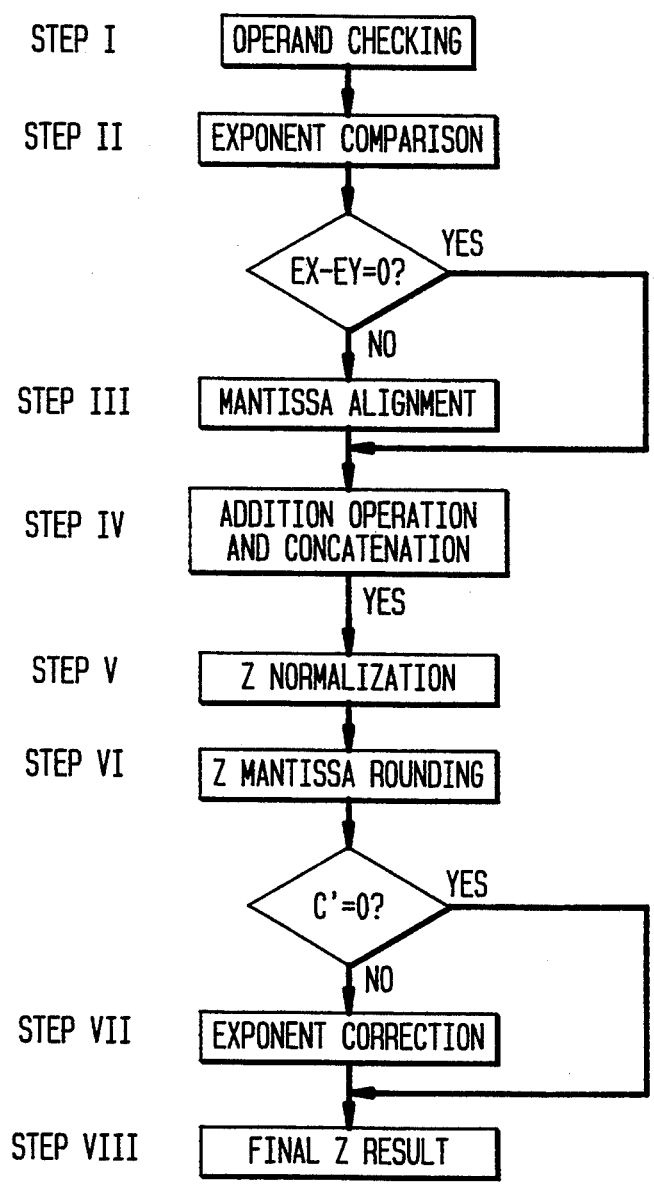
FIG. 4 illustrates the eight processing steps that are required according to the method of the present invention to perform any ADD/SUB operation of two IEEE standard format floating-point numbers.

FIG. 4 shows the eight processing steps that remain according to the method of the present invention, and which principle is given below.

Steps I to III are identical in all respects to steps 1 to 3, detailed above.

Step IV. The desired mantissa addition operation takes effect in the mantissa adder according to operand signs. The carry out bit c is concatenated as the MSB of the adder result. A 1 is added to the exponent with the highest value. This step encompasses both steps 4 and 5 of the conventional method illustrated in FIG. 3.

Step V and VI are identical in all respect to steps 6 and 7 detailed above.

Step VII simply consists in an exponent correction.
Step VIII is identical to step 9.

By way of example, the method of the present invention in the light of Examples I and II will now be illustrated.

In Example I, where no carry out bit is generated (c=0), a 1 is added to the largest of the two exponents, i.e., EX=2, leading to an intermediate value of 3. Since there is one leading 0 in the mantissa adder result, normalization is required, i.e., the normalizer shifts left the mantissa adder result by one bit. Consequently, a 1 is subtracted to the intermediate exponent 3, so that, EZ=2 and Z=1.11*2**2

In Example II, where a carry out bit is generated (c=1), this carry out bit becomes the MSB of the mantissa adder result and a 1 is added to the highest exponent due to the absence of loading 0's, and the final result is directly obtained, i.e., Z=1.10*2**3. Thus, in both cases, a 1 has been added to the highest exponent and the correct result is obtained after normalization (the normalizer may have shifted left, as in Example I, or not, as in Example II), regardless as to whether the carry out bit c is equal to 0 or to 1.

Figure 5:
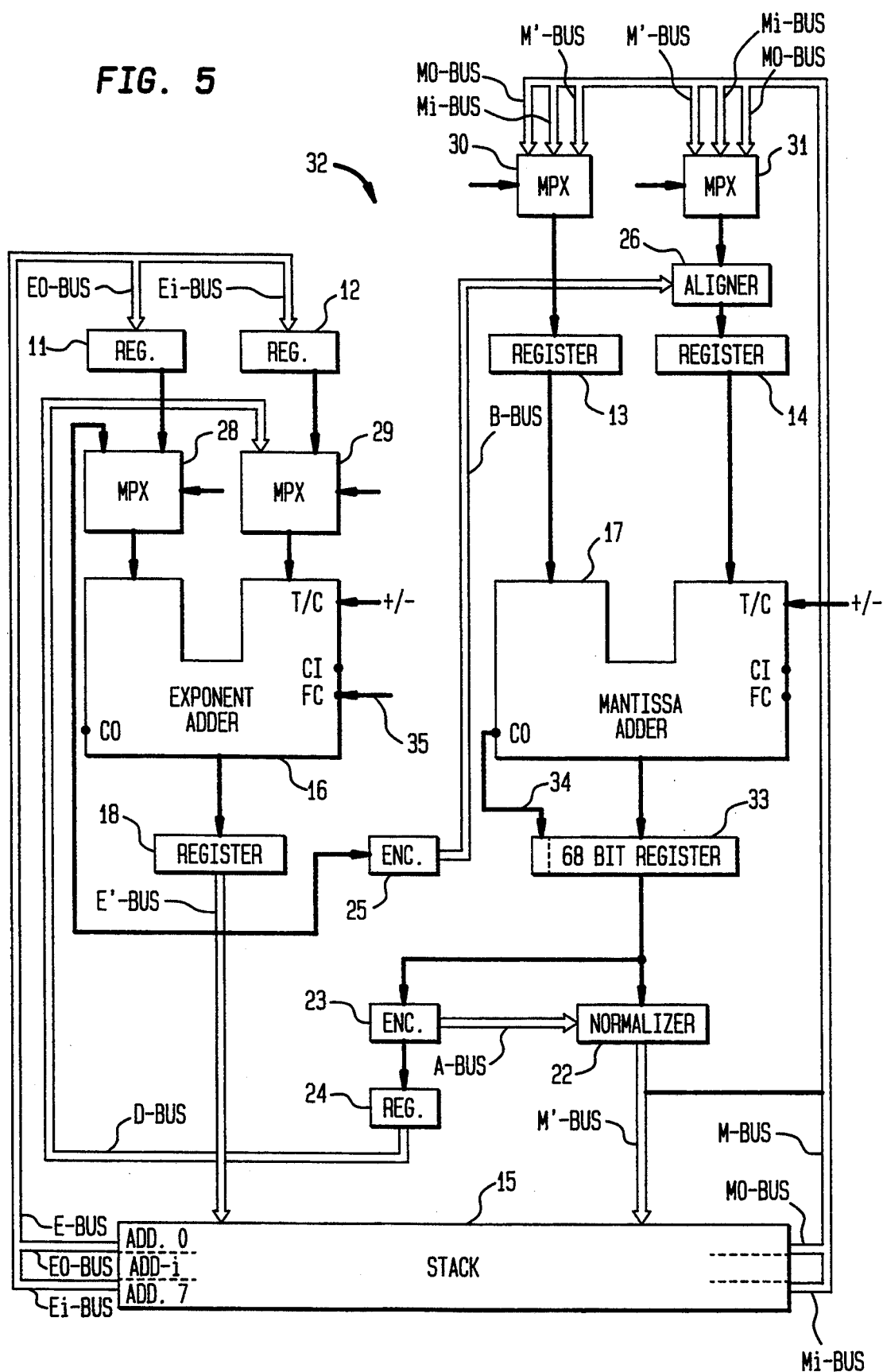
FIG. 5 shows the schematical block diagram of the apparatus to perform any ADD/SUB operations of floating-point numbers using the particular IEEE standard format of FIG. 1 in accordance with the present invention.

Referring now to FIG. 5 which shows the improved apparatus 30 according to the present method. Identical parts bear the same references as in FIG. 3.

Figure 1:
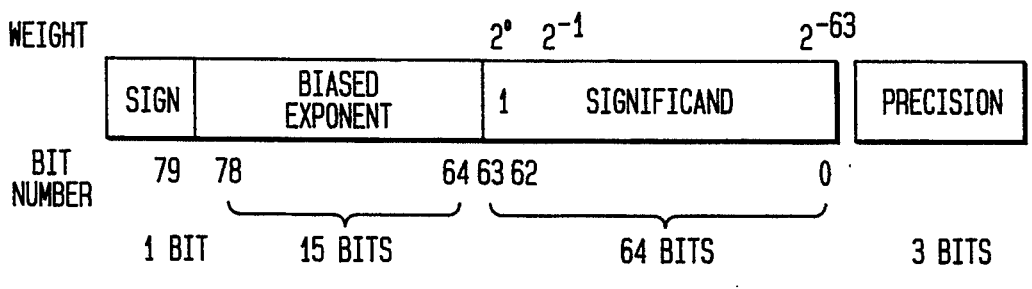
FIG. 1 shows the IEEE standard basic 80-bit double extended precision floating-point format used as an example.
Figure 2:
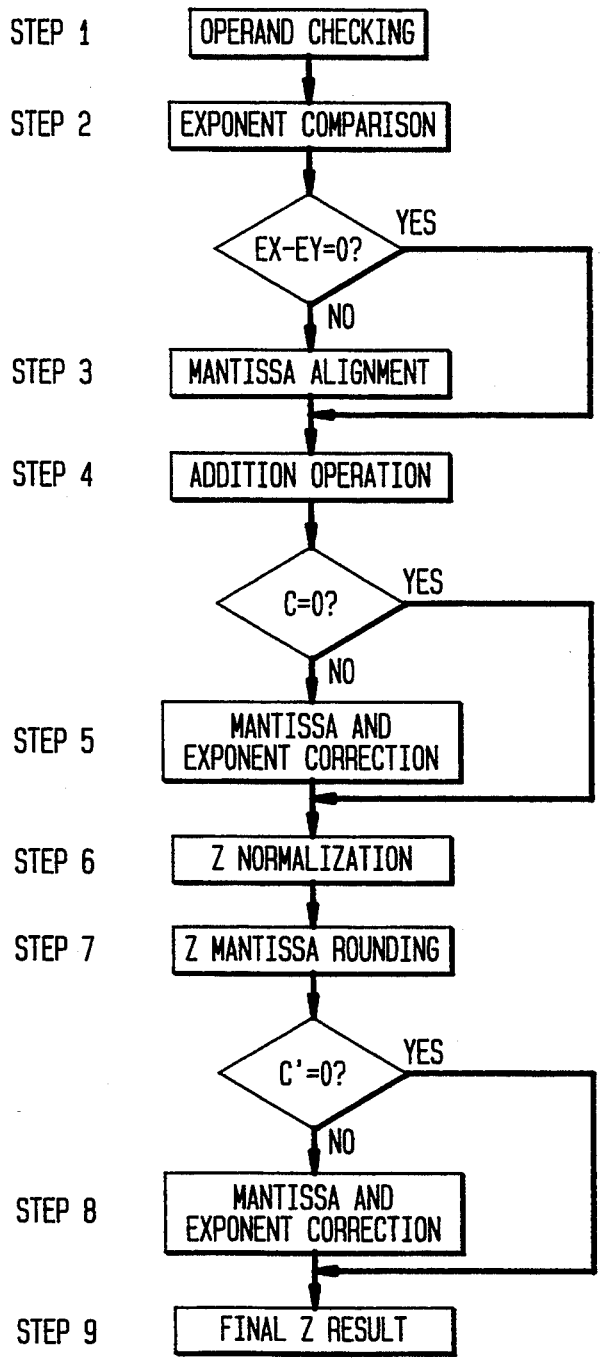
FIG. 2 illustrates the basic nine processing steps that are necessary in general to perform ADD/SUB operations of two IEEE standard format floating-point numbers.
Figure 3:
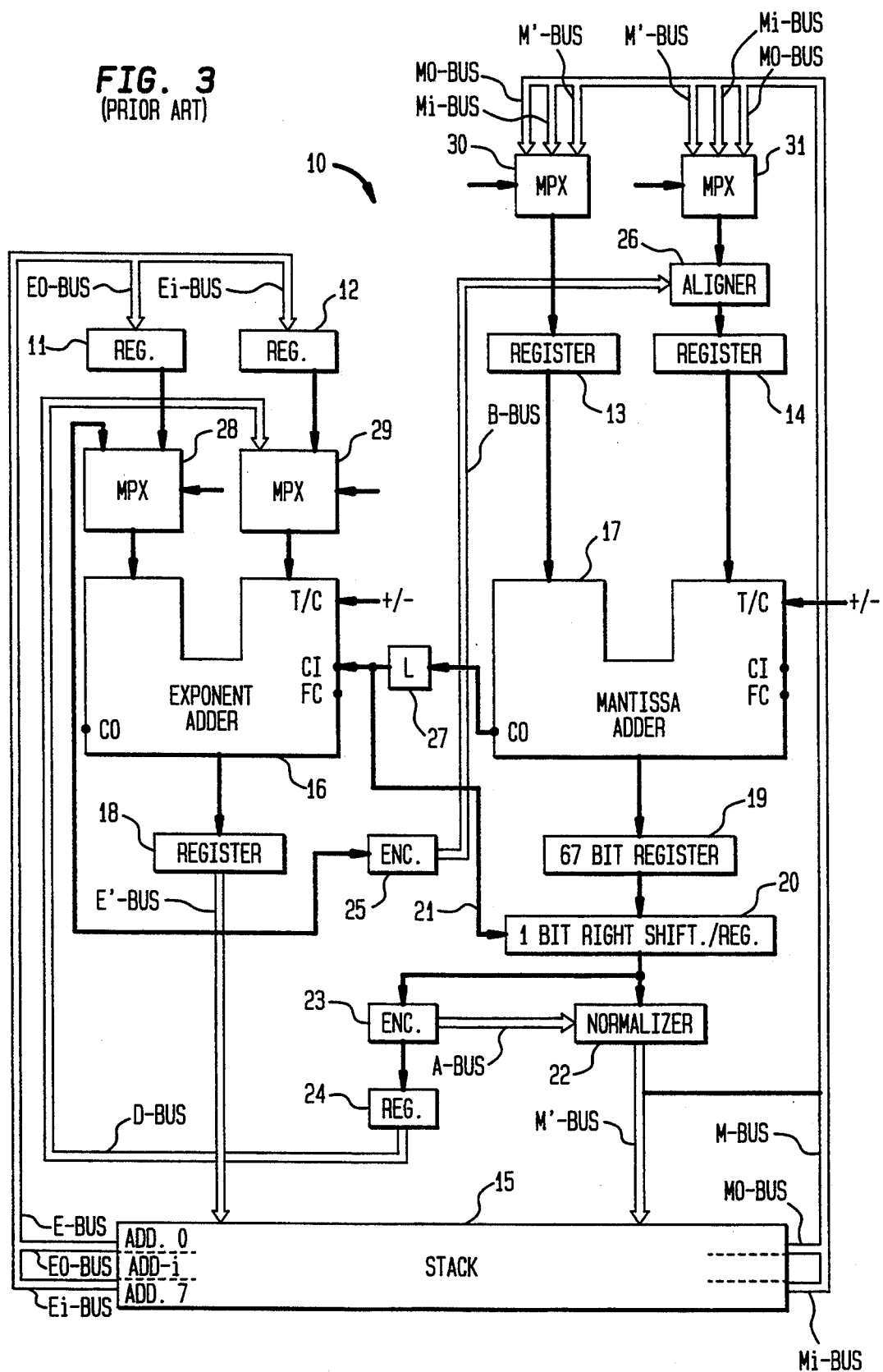
FIG. 3 shows the schematical block diagram of an apparatus for executing ADD/SUB operations of floating-point numbers using the particular IEEE standard format of FIG. 1 that could be designed by someone skilled in the art.

With respect to the hardware architecture of FIG. 3, circuit 20 and latch 27 are no longer necessary and thus have been eliminated. Instead of having 67 bit positions, the output register associated with the mantissa adder 17, referred as 33, comprises 68 bit positions. The 68th position corresponds to the MSB of the result and is fed by the carry out bit c generated by adder 17 at output CO, via control line 34. Systematically, the control logic circuitry applies an appropriate voltage level to the "Force Carry" input FC of adder 16 to add a 1 to the LSB of the largest exponent.

Operation will now be briefly discussed in conjunction with FIGS. 4 and 5.

Step I. Operands X and Y are checked. Operand X, which is stored in stack 15 at address 0, is loaded in input registers 11 and 13, respectively, for its exponent EX and mantissa MX components. Similarly, the exponent EY and mantissa MY, of operand Y which is stored in stack 15 at address i, are loaded in input registers 12 and 14.

Step II. Comparison of exponents is made in adder 16, which proceeds to determine the difference of exponents, i.e., performs EX-EY. In Example II, EX=EY =2, the exponent difference is thus equal to 0, no alignment in aligner 26 is therefore required for the operand of the smallest magnitude. The mantissas that are loaded in registers 13 and 14 are correct. Unlike in Example I, the exponents are different, i.e., EX=2 and EY=1, so that the mantissa of operand Y has to be aligned, i.e., shifted right. The exponent difference, which is equal to 1, is stored in output register 18. This amount is coded in circuit 25 which subsequently will control aligner circuit 26 via control bus B-BUS.

Step III. During this step, operand mantissas are aligned in aligner 26 if EX−EY≠0. If the exponent difference is equal to 0, this step is bypassed.

If EX−EY<0, the mantissa of operand X is aligned in aligner 26, before being stored in input register 14 while mantissa of operand Y is stored in input register 13

If EX−EY>0, the mantissa of operand Y is aligned in aligner 26 before being stored in input register 14, while mantissa of operand X is stored in input register 13.

Briefly summarized, step III is optional. If $EX-EY=0$, it is bypassed because no alignment is necessary. If $EX-EY \neq 0$, the operand with the smallest magnitude must be loaded in register 14, in overwriting the content thereof.

Step IV. The desired mantissa addition operation takes place in adder 17 according to instructions and operand signs. The data generated by adder 17 is stored in the 68-bit output register 33, whose 68th-bit position is filled by the carry out bit c as the MSB of the result. From the exponent difference computed in step II, the control logic detects which register 11 or 12 contains the highest exponent. The exponent of the biggest magnitude (depending upon the comparison made in step II) is transferred in adder 16 and a 1 is added thereto by forcing a 1 on the "Force Carry" input (FC) using the existing circuitry (not shown) via control line 35. The exponent result is transferred in output register 18.

Step V. The mantissa is normalized, i.e, the content of register 33 is transferred to register 13 through normalizer 22 and the M'-BUS. The number of leading 0's are encoded in encoder 23 and latched in register 24 to be subsequently subtracted to the result exponent in adder 16.

Step VI. The mantissa rounding operation can now take place pursuant to the IEEE 754 standard, as explained above with regards to FIG. 3. The adder 17 content is fed in output register 33, and the carry out bit is latched as the MSB thereof (as the 68th bit).

Step VII. The exponent correction is now performed if carry out bit $c'=1$. To that end, the content of register 18 is applied to adder 16 via multiplexer 28 and the E'-BUS and a 1 is added thereto to perform the $+1$ addition in the same manner that in step IV. The correct exponent is then stored in register 18.

Step VIII. The operand result mantissa is normalized in normalizer 22. The sign, exponent and mantissa of the result are stored in stack 15 at address 0.

A machine cycle comparison between the circuit 32 of FIG. 5 and the circuit 10 of FIG. 3, using simulations based upon the SAXPY loop of LINPACK which is a universally recognized benchmark, shows 45 instead of 22, for an ADD operation. As a result, circuit 32 is more than 50% faster than circuit 10.

The method of present invention is not only used in the ADD/SUB operations but also in the MULTIPLY operations as well, but in the latter case its contribution to the overall performance improvement is then to determine.

While only a few illustrative embodiments have been described in detail, it should be apparent to those skilled in the art that there are other variations within the scope of the invention which is more particularly defined in the appended claims.

What is claimed is:

1. An apparatus for executing an addition/subtraction operation between a pair of floating-point operands, each comprising a sign, an exponent and a mantissa, said apparatus comprising:

exponent input register means for storing the respective exponents of each of the operands;

exponent adder means for generating a result by adding a 1 to the larger exponent stored in said exponent input register means;

exponent output register means for storing the exponent result, responsive to said exponent adder means;

mantissa input register means for storing the respective mantissas of each of the operands;

mantissa adder means for generating a result including a carry out bit by operating on the pair of mantissas stored in said mantissa input register means, responsive to said mantissa input register means;

mantissa output register means for storing the mantissa result, responsive to said mantissa adder means;

normalizing means attached to said mantissa output register means for normalizing the result stored in said mantissa output register means;

mantissa rounding means including said mantissa adder means for rounding said normalized result; and exponent correction means responsive to the result of said mantissa rounding means for generating a corrected exponent.

2. The apparatus of claim 1 wherein said mantissa output register means further comprises a supplementary latching position to store a bit generated by said mantissa adder means.

3. The apparatus of claim 2, further comprising stacking means to store said pair of floating-point operands to be added/subtracted, said stacking means providing data respectively to said exponent and said mantissa register means.

4. The apparatus of claim 1, wherein said pair of floating-point operands to be added/subtracted have a format which is in compliance with an IEEE 754 standard.

5. The apparatus of claim 4, wherein said format has an 80-bit double extended precision with three precision bits added thereto.

6. The apparatus of claim 5, wherein said mantissa output register means comprises 68 latching positions.

7. The apparatus of claim 1, wherein said mantissa output register means stores the mantissa result in bit form, wherein the carry out bit generated by said mantissa adder means is a new Most Significant Bit of said result.

* * * * *